US012677324B2

(12) United States Patent
Feltrin et al.

(10) Patent No.: US 12,677,324 B2
(45) Date of Patent: Jul. 7, 2026

(54) USER EQUIPMENT, RADIO NETWORK NODE, AND METHODS PERFORMED IN A WIRELESS COMMUNICATION NETWORK

(71) Applicant: Telefonaktiebolaget LM Ericsson (publ), Stockholm (SE)

(72) Inventors: Luca Feltrin, Solna (SE); Jan Christoffersson, Luleå (SE); Andreas Höglund, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 312 days.

(21) Appl. No.: 18/288,532

(22) PCT Filed: Apr. 28, 2022

(86) PCT No.: PCT/SE2022/050411
§ 371 (c)(1),
(2) Date: Oct. 26, 2023

(87) PCT Pub. No.: WO2022/231506
PCT Pub. Date: Nov. 3, 2022

(65) Prior Publication Data
US 2024/0215075 A1     Jun. 27, 2024

Related U.S. Application Data

(60) Provisional application No. 63/181,975, filed on Apr. 30, 2021.

(51) Int. Cl.
*H04W 74/0833*     (2024.01)
*H04W 72/23*     (2023.01)
(Continued)

(52) U.S. Cl.
CPC ....... *H04W 74/0833* (2013.01); *H04W 72/23* (2023.01); *H04W 74/08* (2013.01); *H04W 72/04* (2013.01); *H04W 74/006* (2013.01)

(58) Field of Classification Search
CPC . H04W 74/0833; H04W 72/23; H04W 72/04; H04W 74/08; H04W 74/006
See application file for complete search history.

(56) References Cited

U.S. PATENT DOCUMENTS

2020/0145975 A1* 5/2020 Zhang ................. H04W 72/044
2022/0304046 A1* 9/2022 Lin ........................ H04L 5/0053
(Continued)

FOREIGN PATENT DOCUMENTS

KR     20190117254 A     10/2019

OTHER PUBLICATIONS

Sony, "Configuration of CORESET and Search space for SDT," 3GPP TSG-RAN WG1 Meeting #104b, R1-2103286, Online, Apr. 12-20, 2021 (3 pages).
(Continued)

*Primary Examiner* — Omar J Ghowrwal
(74) *Attorney, Agent, or Firm* — Rothwell, Figg, Ernst & Manbeck, P.C.

(57) ABSTRACT

Embodiments herein relate to, for example, a method performed by UE (10) for handling communication in the wireless communications network 1. The UE initiates a random access procedure for small data transmissions; and monitors for a message using a Type4-PDCCH CSS, or a USS, wherein the Type4-PDCCH CSS and/or the USS uses a radio resource set separated or partly overlapping a legacy radio resource set for a legacy CSS.

22 Claims, 13 Drawing Sheets

(51) Int. Cl.

| | |
|---|---|
| *H04W 74/08* | (2024.01) |
| *H04W 72/04* | (2023.01) |
| *H04W 74/00* | (2009.01) |

(56) References Cited

U.S. PATENT DOCUMENTS

| | | | |
|---|---|---|---|
| 2024/0008050 A1* | 1/2024 | Zhou | H04W 72/231 |
| 2024/0073920 A1* | 2/2024 | Turtinen | H04W 72/232 |

OTHER PUBLICATIONS

Samsung, "Configured Grant based Small Data Transmission," 3GPP TSG-RAN2 Meeting #112 Electronic, R2-2009094, Nov. 2-13, 2020 (8 pages).
International Search Report and Written Opinion dated Jul. 26, 2022 issued in International Patent Application No. PCT/SE2022/050411 (9 pages).

International Preliminary Report on Patentability dated Jun. 9, 2023 issued in International Patent Application No. PCT/SE2022/050411 (15 pages).
ZTE et al., "Discussion on the physical layer aspects of small data transmission", R1-2100080, 3GPP TSG RAN WG1 #104-e, e-Meeting, Jan. 25-Feb. 5, 2021, XP051970784 (7 pages).
Ericsson, "RACH based small data transmission", R2-2103519, 3GPP TSG-RAN WG2 #113bis-e, Electronic meeting, Apr. 12-20, 2021, XP051992125 (4 pages).
Ericsson, "Details of RACH based SDT", Tdoc R2-2009963, 3GPP TSG-RAN WG2 #112e, Electronic meeting, Nov. 2-13, 2020 (6 pages).
3GPP TS 38.321 V16.4.0, Mar. 2021, Technical Specification, 3rd Generation Partnership Project; Technical Specification Group Radio Access Network; NR; Medium Access Control (MAC) protocol specification (Release 16) (157 pages).
RAN1, "Reply LS on physical layer aspects of small data transmission", R1-2102125, 3GPP TSG-RAN WG1 Meeting #104-e, e-Meeting, Jan. 25-Feb. 5, 2021 (2 pages).
ZTE Corporation, "Work Item on NR small data transmissions in Inactive state", RP-200954 (update of RP-193252), 3GPP TSG RAN Meeting #86, Sitges, Spain, Dec. 9-12, 2019 (5 pages).

* cited by examiner

USER EQUIPMENT, RADIO NETWORK NODE, AND METHODS PERFORMED IN A WIRELESS COMMUNICATION NETWORK

CROSS REFERENCE TO RELATED APPLICATIONS

This application is a 35 U.S.C. § 371 National Stage of International Patent Application No. PCT/SE2022/050411, filed 2022 Apr. 28, which claims priority to U.S. Provisional Patent Application No. 63/181,975, filed on 2012 Apr. 30. The above-identified applications are incorporated by this reference.

TECHNICAL FIELD

Embodiments herein relate to a user equipment (UE), a radio network node, and methods performed therein regarding communication in a wireless communication network. Furthermore, a computer program product and a computer-readable storage medium are also provided herein. Especially, embodiments herein relate to handling communication, e.g., handling access to the wireless communication network.

BACKGROUND

In a typical wireless communication network, UEs, also known as wireless communication devices, mobile stations, stations (STA) and/or wireless devices, communicate via a Radio access Network (RAN) to one or more core networks (CN). The RAN covers a geographical area which is divided into service areas or cells, with each service area or cell being served by a radio network node such as an access node e.g. a Wi-Fi® access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the UEs within range of the access node. The radio network node communicates over a downlink (DL) to the UE and the UE communicates over an uplink (UL) to the radio network node. The radio network node may be a distributed node comprising a remote radio unit and a separated baseband unit.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with UEs. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the $3^{rd}$ Generation Partnership Project (3GPP) and this work continues in the coming 3GPP releases, such as for 5G and next generation networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the RAN of an EPS has an essentially "flat" architecture comprising radio network nodes connected directly to one or more core networks.

With the emerging 5G technologies also known as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions. 5G is the fifth generation of cellular technology and was introduced in Release 15 of the 3GPP standard. It is designed to increase speed, reduce latency, and improve flexibility of wireless services. The 5G system (5GS) includes both a new radio access network (NG-RAN) and a new core network (5GC).

NR Small Data Transmissions in Inactive State.

A new Work Item (WI) RP-200954 'New Work Item on NR small data transmissions in INACTIVE state' has been approved in 3GPP with the focus of optimizing the transmission for small data payloads by reducing the signalling overhead. The WI contains the following relevant objectives:

---

This work item enables small data transmission in RRC_INACTIVE state as follows:
- For the RRC_INACTIVE state:
  - o UL small data transmissions for random access channel (RACH)-based schemes (i.e. 2-step and 4-step RACH):
    - ■ General procedure to enable user plane (UP) data transmission for small data packets from INACTIVE state (e.g. using message A (MSGA) or MSG3) [RAN2]
    - ■ Enable flexible payload sizes larger than the Rel-16 common control channel (CCCH) message size that is possible currently for INACTIVE state for MSGA and MSG3 to support UP data transmission in UL (actual payload size can be up to network configuration) [RAN2]
    - ■ Context fetch and data forwarding (with and without anchor relocation) in INACTIVE state for RACH-based solutions [RAN2, RAN3]

-continued

Note 1: The security aspects of the above solutions should be checked with SA3
    o   Transmission of UL data on pre-configured physical uplink shared channel
        (PUSCH) resources, i.e., reusing the configured grant type 1 - when timing
        advance (TA) is valid
            ■   General procedure for small data transmission over configured grant
                type 1 resources from INACTIVE state [RAN2]
            ■   Configuration of the configured grant type1 resources for small data
                transmission in UL for INACTIVE state [RAN2]

For narrowband internet of things (NB-IoT) and LTE-Machine Type Communication (MTC) similar signalling optimizations for small data have been introduced through Rel-15 Early Data Transmission (EDT) and release (Rel)-16 Preconfigured Uplink Resources (PUR). Somewhat similar solutions could be expected for NR with the difference that the Rel-17 NR Small Data is only to be supported for radio resource control (RRC) INACTIVE state, includes also 2-step RACH based small data, and that it should also include regular complexity mobile broadband (MBB) UEs. Both support mobile originated (MO) traffic only.

Within the context of Small Data Transmission (SDT) the possibility of transmitting subsequent data has been discussed, meaning transmission of further segments of the data that cannot fit in the Msg3 Transport Block. Such segments of data can be transmitted either in RRC_CONNECTED as in legacy after the 4-step RACH procedure has been completed, or they can be transmitted in RRC_INACTIVE before the UE transitions to RRC_CONNECTED. In the former case the transmission will be more efficient as the gNB and UE are appropriately configured based on the current UE channel conditions, while in the latter case several optimizations are not in place yet, especially if the UE has moved while not connected, and also the transmission may collide with the transmission from other UEs as the contention has not been resolved yet. The Work Item has already started in 3GPP meeting RAN2 #111-e, and the following relevant agreements have already been made:

Small data transmission with RRC message is supported as baseline for random access (RA)-based and configured grant (CG) based schemes The 2-step RACH or 4-step RACH should be applied to RACH based uplink small data transmission in RRC_INACTIVE The uplink small data can be sent in MSGA of 2-step RACH or msg3 of 4-step RACH.

Small data transmission is configured by the network on a per data radio bearer (DRB) basis Data volume threshold is used for the UE to decide whether to do SDT or not. For further study (FFS) how we calculate data volume.

FFS if an "additional SDT specific" reference signal received power (RSRP) threshold is further used to determine whether the UE should do SDT UL/DL transmission following UL SDT without transitioning to RRC_CONNECTED is supported When UE is in RRC_INACTIVE, it should be possible to send multiple UL and DL packets as part of the same SDT mechanism and without transitioning to RRC_CONNECTED on dedicated grant. FFS on details and whether any indication to network is needed So, in NR Rel-17 SDT work item, two main solutions will be specified for enabling SDT in RRC_INACTIVE state: RACH-based SDT (i.e., transmitting small data on Message A physical uplink shared channel (PUSCH) in a 2-step RACH procedure, or transmitting small data on Message 3

PUSCH in a 4-step RACH procedure) and Configured Grant (CG) based SDT (i.e., SDT over configured grant type-1 PUSCH resources for UEs in RRC inactive state). The 4-step, 2-step RACH and configured grant type have already been specified as part of Rel-15 and Rel-16. So, the SDT features to be specified in NR Rel-17 build on these building blocks to enable small data transmission in INACTIVE state for NR.

Notice that some of the mechanisms discussed in this document are already agreed, and serve the purpose of presenting a complete working solution.

In RAN2 #112-e, and the following agreements have been made:

Agreements:

1 The configuration of configured grant resource for UE uplink small data transfer is contained in the RRCRelease message. FFS if other dedicated messages can configure CG in INACTIVE CG. Configuration is only type 1 CG with no contention resolution procedure for CG.

2 The configuration of configured grant resource can include one type 1 CG configuration. FFS if multiple configured CGs are allowed 3 A new TA timer for TA maintenance specified for configured grant based small data transfer in RRC_INACTIVE should be introduced. FFS on the procedure, the validity of TA, and how to handle expiration of TA timer. The TA timer is configured together with the CG configuration in the RRCRelease message.

4 The configuration of configured grant resource for UE small data transmission is valid only in the same serving cell. FFS for other CG validity criteria (e.g. timer, UL/supplementary uplink (SUL) aspect, etc)

5 The UE can use configured grant based small data transfer if at least the following criteria is fulfilled (1) user data is smaller than the data volume threshold; (2) configured grant resource is configured and valid; (3) UE has valid TA. FFS for the candidate beam criteria.

6 From RAN2 point of view: An association between CG resources and synchronization signal blocks (SSB) is required for CG-based SDT. FFS up to RAN1 how the association is configured or provided to the UE. Send an LS to RAN1 to start the discussion on how the association can be made. Mention that one option RAN2 considered was explicit configuration with RRC Release message 7 A synchronization signal (SS)-RSRP threshold is configured for SSB selection. UE selects one of the SSB with SS-RSRP above the threshold and selects the associated CG resource for UL data transmission.

In RAN2 #113-e, and the following agreements have been made:

Agreements

1. CG-SDT resource configuration is provided to UEs in RRC_Connected only within the RRCRelease message, i.e. no need to also include it in RRCReconfiguration message 2. CG-PUSCH resources can be separately configured for normal UL (NUL) and SUL. FFS if we allow them at the same time. This depends on the alignments change requests (CR) for Rel-16.

3. RRCRelease message is used to reconfigure or release the CG-SDT resources while UE is in RRC_INAC-TIVE 4. For CG-SDT the subsequent data transmission can use the CG resource or dynamic grant (DG) i.e. dynamic grant addressed to UE's cell radio network temporary identifier (C-RNTI). Details on C-RNTI, can be the same as the previous C-RNTI or may be configured explicitly by the network can be discussed in stage 3

5. TAT-SDT is started upon receiving the time alignment timer (TAT)-SDT configuration from gNB, i.e. RRCre-lease message, and can be (re)started upon reception of TA command.

6. From RAN2 point of view, assume similar to PUR, that we introduce a TA validation mechanism for SDT based on RSRP change, i.e. RSRP-based threshold(s) are configured. Ask RAN1 to confirm. FFS on how to handle CG configuration when TA expires or when is invalid due to RSRP threshold. Details of the TA validation procedure can be further discussed.

7. As a baseline assumption, it's a network configuration issue whether to support multiple CG-SDT configurations per carrier in RRC_INACTIVE (i.e. we will not restrict network configuration for now).

8. FFS Discuss further in stage 3 how to specify the agreement that CG-SDT resources are only valid in one cell (i.e. cell in which RRCRelease is received)

9. UE releases CG-SDT resources when TAT expires in RRC_Inactive state

Agreements

1. For RA-SDT, up to two preamble groups (corresponding to two different payload sizes for MSGA/MSG3) may be configured by the network 2. [CB] UE performs carrier selection as per legacy procedure and then the UE determines whether SDT can be initiated.

3. [CB] Upon initiating SDT, after the carrier selection, if valid CG-SDT resource exists, then CG-SDT is chosen, otherwise UE proceeds to RA-SDT procedure.

4. If RACH procedure is initiated for SDT (i.e. RA-SDT initiated), the UE first performs RACH type selection as specified in medium access control (MAC) (i.e. Rel-16). FFS whether threshold is SDT specific or not Agreements:

1. RAN2 continues to progress the work based the separate RACH resources for SDT (i.e. explicit mechanisms to support common resources won't be pursued unless there is sufficient support for this. However, use of common RACH resources will not be precluded if possible, via implementation 2. RAN2 design assumes that RRCRelease message is sent at the end to terminate the SDT procedure from RRC point of view. The RRCRelease sent at the end of the SDT may contain the CG resource (as per previous agreement). Write an LS to SA3 to explain SDT procedure and agreement.

3. The UE behaviour for handling of non-SDT data arrival after sending the first UL data packet is fully specified (i.e. not left to UE implementation)

4-Step RA Type

The 4-step RA type has been used in 4G LTE and is also the baseline for 5G NR.

The principle of this procedure in NR is shown in FIG. 1.

Step 1: Preamble Transmission

The UE randomly selects a RA preamble (PREAMB-LE_INDEX) corresponding to a selected SS/physical broad-cast channel (PBCH) block, transmit the preamble on the PRACH occasion mapped by the selected SS/PBCH block. When the gNB detects the preamble, it estimates the Timing advance (TA) the UE should use in order to obtain UL synchronization at the gNB.

Step 2: RA Response (RAR)

The gNB sends a RA response (RAR) including the TA, the temporary C-RNTI (temporary identifier) to be used by the UE, a Random Access Preamble identifier that matches the transmitted PREAMBLE_INDEX and a grant for Msg3. The UE expects the RAR and thus, monitors physical downlink control channel (PDCCH) addressed to RA-RNTI to receive the RAR message from the gNB until the con-figured RAR window (ra-ResponseWindow) has expired or until the RAR has been successfully received.

From 3GPP TS38.321: "The MAC entity may stop ra-ResponseWindow (and hence monitoring for Random Access Response(s)) after successful reception of a Random Access Response containing Random Access Preamble identifiers that matches the transmitted PREAMBLE_IN-DEX."

Step 3: "Msg3" (UE ID or UE-Specific C-RNTI)

In Msg3 the UE transmits its identifier (UE ID, or more exactly the initial part of the 5G-Temporary Mobile Sub-scriber Identity (TMSI) for initial access or if it is already in RRC_CONNECTED or RRC_INACTIVE mode and needs to e.g. re-synchronize, its UE-specific RNTI.

If the gNB cannot decode Msg3 at the granted UL resources, it may send a downlink control information (DCI) addressed to TC-RNTI for retransmission of Msg3. Hybrid automatic repeat request (HARQ) retransmission is requested until the UEs restart the random access procedure from step 1 after reaching the maximum number of HARQ retransmissions or until Msg3 can be successfully received by the gNB.

Step 4: "Msg4" (Contention Resolution)

In Msg4 the gNB responds by acknowledging the UE ID or C-RNTI. The Msg4 gives contention resolution, i.e. only one UE ID or C-RNTI will be used even if several UEs have used the same preamble (and the same grant for Msg3 transmission) simultaneously. For Msg4 reception, the UE monitors temporary C-RNTI (if it transmitted its UE ID in Msg3) or C-RNTI (if it transmitted its C-RNTI in Msg3).

The 2-step RA type gives much shorter latency than the ordinary 4-step RA. In the 2-step RA the preamble and a message corresponding to Msg3 (msgA PUSCH) in the 4-step RA can, depending on configuration, be transmitted in two subsequent slots. The msgA PUSCH is sent on a resource dedicated to the specific preamble. The 2-step RA procedure is depicted in FIG. 2.

Upon successful reception msgA, the gNB will respond with a msgB. The msgB may be either a "successRAR", "fallbackRAR or "Back off". The content of msgB has been agreed as seen below. It is noted in particular that fallback-RAR provides a grant for a Msg3 PUSCH that identifies resources in which the UE should transmit the PUSCH, as well as other information.

Note: The notations "msgA" and "MsgA" are used inter-changeably herein to denote message A. Similarly, the notations "msgB" and "MsgB" are used interchangeably herein to denote message B.

The possibility to replace the 4-step message exchange by a 2-step message exchange would lead to reduced RA latency. On the other hand, the 2-step RA will consume more resources since it uses contention-based transmission of the data. This means that the resources that are configured for the data transmission may often be unused. Another difference is that 2-step RA operated without a timing advance (TA) since there is no feedback from gNB on how to adjust the uplink synchronization before the data payload is transmitted in MsgA PUSCH. Effectively TA is zero for 2-step RA and therefore the solution is restricted to use in cell of smaller size, whereas 4-step RA can operate in any cell size.

If both the 4-step and 2-step RA are configured in a cell on shared PRACH resources (and for the UE), the UE will choose its preamble from one specific set if the condition of 4-step RA is met, and from another set if the condition of 2-step RA (based on the measured RSRP) is met. Hence a preamble partition is done to distinguish between 4-step and 2-step RA when shared PRACH resources are used. Alternatively, the PRACH configurations are different for the 2-step and 4-step RA procedure, in which case it can be deduced from where the preamble transmission is done if the UE is doing a 2-step or 4-step procedure.

When the 4-step RA is applied for SDT, the Msg3 will contain the RRCResumeRequest message and UP data. The gNB will as in the legacy case respond with the contention resolution ID (CR-ID) to resolve contention and at this point the TC-RNTI will be used by the UE as C-RNTI, i.e. the UE will monitor PDCCH for DCI scrambled by C-RNTI to obtain new UL grants, in case subsequent transmissions are needed. The SDT procedure ends when the gNB sends a RRCRelease with suspend config message and thereby keeping the UE in Inactive state. Alternatively, the gNB may instead send a RRCResume and move the UE to connected state.

PDCCH Search Spaces

PDCCH Search Space (SS) refers to the area in the downlink resource grid where PDCCH may be carried. A UE may be configured to monitor several Search Spaces where a configuration generally consists in its time-frequency location and periodicity, aggregation level, which DCI format is carried and to which CORESET the SS is mapped to.

There are mainly two kinds of SSs, Common SS (CSS) and User-specific SSs (USS). A CSS is generally configured in System Information and so all users will monitor the same resources. The CSSs are generally used to deliver scheduling commands for Msg2, MsgB, Msg4, Paging messages etc. The DCI carried in the associated PDCCH is scrambled by an identifier (RNTI), so to each SS there is an associated RNTI address space. A USS on the other hand, is configured by the network and only a certain UE monitors that set of resources, although a RNTI is still used for scrambling. Usually an USS is configured while the UE is in RRC_CONNECTED for scheduling of data transmission.

SUMMARY

In order to schedule subsequent packet transmissions after contention resolution, and before the UE enters RRC_CONNECTED through a DL RRC message, the scheduling command used for this scope must be carried by some Search Space as agreed in 3GPP. At that point in time, the UE is configured with Type1-PDCCH CSS. This SS, though, already carry other DCIs scrambled by several different RNTIs (e.g.: RA-RNTI/Msg2, MSGB-RNTI/MsgB, TC-RNTI/Msg4, . . . ), so the addition of DCIs scheduling subsequent packet transmissions may degrade the legacy performance of the PDCCH. Moreover, the RNTI space in Type1-PDCCH CSS is mostly used by RA/MSGB-RNTI, so the ability to address multiple UEs through multiple RNTIs is further limited for this reason. Additionally, the use of CS-RNTI scrambled DCI may be considered, for supporting retransmissions for CG-based SDT.

An object of embodiments herein is to provide a mechanism that handles communication in the wireless communication network in an efficient and improved manner. Embodiments herein regard Search Spaces that should be used to carry the UL Grants for subsequent packet transmissions for example a new Common Search Space (CSS) separate from Type1-PDCCH CSS, denoted as Type4-PDCCH CSS, or a User-specific Search Space (USS), this in order to be able to offload the existing Type1-PDCCH CSS to avoid negative impact on legacy.

According to an aspect the object is achieved by providing a method performed by a user equipment for handling communication in a wireless communication network. The UE initiates a random access procedure for small data transmissions. The UE monitors for a message from a radio network node, using a Type4-PDCCH CSS or a USS, wherein the type4-PDCCH CSS and/or the USS uses a radio resource set separated or partly overlapping a legacy radio resource set for a legacy CSS.

According to another aspect the object is achieved by providing a method performed by a radio network node for handling communication in a wireless communication network. The radio network node receives, from a UE, a message relating to a random access procedure for small data transmissions. The radio network node transmits a message on radio resources scheduled for the type4-PDCCH CSS or the USS, wherein the type4-PDCCH CSS and/or the USS uses a radio resource set separated or partly overlapping a legacy radio resource set for a legacy CSS.

It is furthermore provided herein a computer program product comprising instructions, which, when executed on at least one processor, cause the at least one processor to carry out any of the methods disclosed herein, as performed by the radio network node, and the UE, respectively. It is additionally provided herein a computer-readable storage medium, having stored thereon a computer program product comprising instructions which, when executed on at least one processor, cause the at least one processor to carry out any of the methods disclosed herein, as performed by the radio network node, and the UE, respectively.

According to an aspect the object is achieved, according to embodiments herein, by providing a radio network node, and a UE configured to perform the methods herein, respectively.

Thus, it is herein disclosed a UE for handling communication in a wireless communication network. The UE is configured to initiate a random access procedure for small data transmissions. The UE is further configured to monitor for a message from a radio network node, using a Type4-PDCCH CSS or a USS, wherein the Type4-PDCCH CSS and/or the USS uses a radio resource set separated or partly overlapping a legacy radio resource set for a legacy CSS.

According to yet another aspect the object is achieved by providing a radio network node for handling communication in a wireless communication network. The radio network node is configured to receive, from a UE, a message relating to a random access procedure for small data transmissions. The radio network node is further configured to transmit a message on radio resources scheduled for the Type4-PDCCH CSS or the USS, wherein the Type4-PDCCH CSS and/or the USS uses a radio resource set separated or partly overlapping a legacy radio resource set for a legacy CSS.

Embodiments herein disclose use of USS and a design of a new CSS (Type4-PDCCH CSS) to deliver PDCCH during an SDT procedure. In particular, it is proposed how and when these SSs should be monitored by the UEs and for which purpose and scheduling commands they are used for. For the USS it is also specified how the network and the UE should maintain the configuration during the UE lifespan and in case of a cell reselection procedure.

In order to not increase the traffic in the legacy CSSs, and cause a drop in performance for the legacy UEs, it is proposed to use a USS or a new CSS to deliver PDCCH to schedule subsequent packet transmissions during an SDT procedure. In case of the USS, several strategies are proposed to maintain the USS configuration during the UE lifetime through legacy and new RRC signalling.

By using a separate or partially overlapped SS, the legacy traffic in the existing CSSs is marginally affected by the additional presence of scheduling commands for subsequent packet transmissions during an SDT procedure, allowing some degree of traffic load balancing for PDCCH. Thus, embodiments herein handle communication in an efficient and improved manner.

BRIEF DESCRIPTION OF THE DRAWINGS

Embodiments will now be described in more detail in relation to the enclosed drawings, in which.

DETAILED DESCRIPTION

Embodiments herein are described in the context of 5G/NR but the same concept can also be applied to other wireless communication system such as 4G/LTE. Embodiments herein may be described within the context of 3GPP NR radio technology (3GPP TS 38.300 V15.2.0 (2018-06)), e.g. using gNB as the radio network node. It is understood, that the problems and solutions described herein are equally applicable to wireless access networks and UEs implementing other access technologies and standards. NR is used as an example technology where embodiments are suitable, and using NR in the description therefore is particularly useful for understanding the problem and solutions solving the problem. In particular, embodiments are applicable also to 3GPP LTE, or 3GPP LTE and NR integration, also denoted as non-standalone NR.

Figure 1:
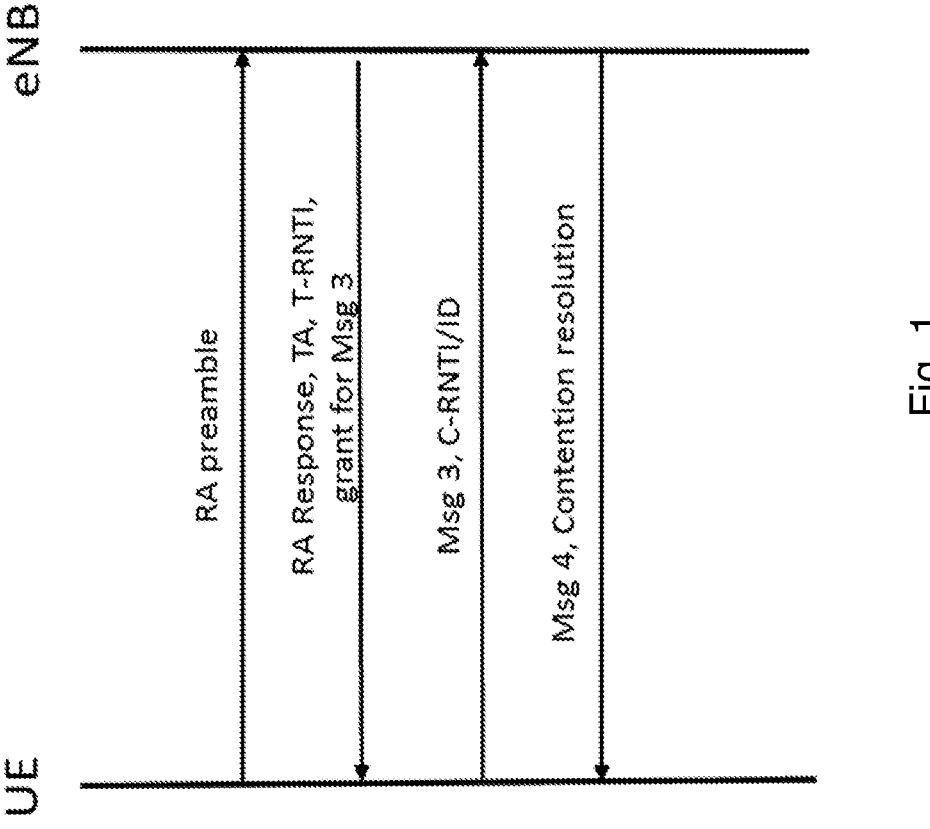
FIG. 1 is a schematic overview depicting a 4-step RA procedure.
Figure 2:
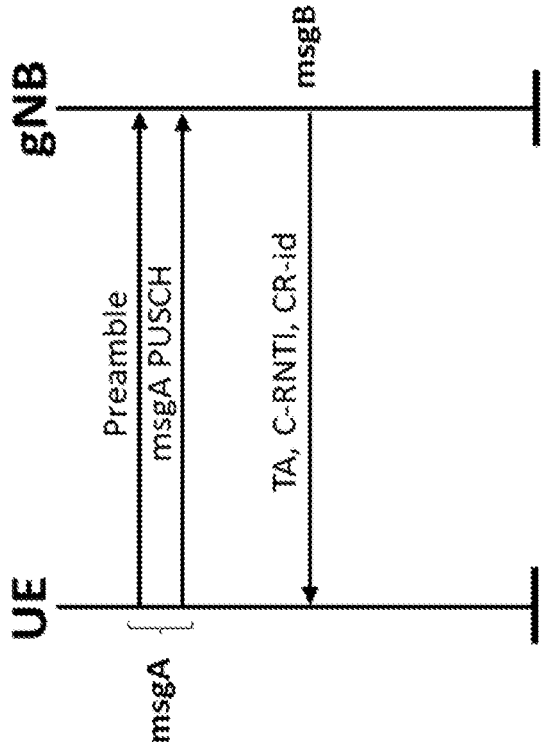
FIG. 2 is a schematic overview depicting a 2-step RA procedure.
Figure 3:
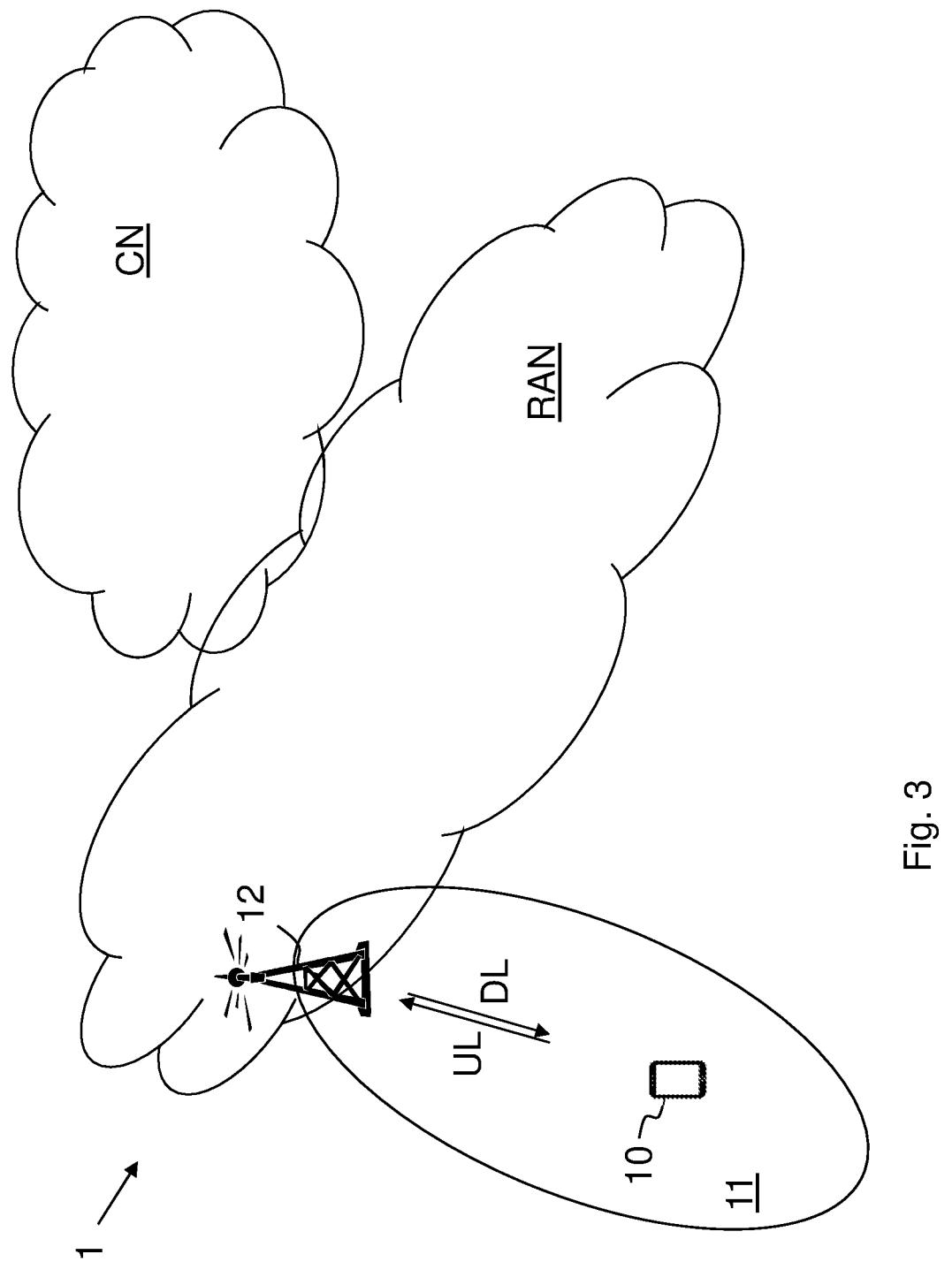
FIG. 3 is a schematic overview depicting a wireless communication network according to embodiments herein.

Embodiments herein relate to wireless communication networks in general. FIG. 3 is a schematic overview depicting a wireless communication network 1. The wireless communication network 1 comprises e.g. one or more RANs and one or more CNs. The wireless communication network 1 may use one or a number of different technologies, such as Wi-Fi®, Long Term Evolution (LTE), LTE-Advanced, NR, Wideband Code Division Multiple Access (WCDMA), Global System for Mobile communications/enhanced Data rate for GSM Evolution (GSM/EDGE), Worldwide Interoperability for Microwave Access (WiMAX®), or Ultra Mobile Broadband (UMB), just to mention a few possible implementations. Embodiments herein relate to recent technology trends that are of particular interest in 5G systems, however, embodiments are also applicable in further development of the existing communication systems such as e.g. a WCDMA or a LTE system.

In the wireless communication network 1, wireless devices e.g. a UE 10 such as a mobile station, a non-access point (non-AP) station (STA), a STA, a user equipment and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, internet of things (IoT) operable device, or node e.g. smart phone, laptop, mobile phone, sensor, relay, mobile tablets or even a small base station capable of communicating using radio communication with a network node within an area served by the network node.

The communication network 1 comprises a radio network node 12 providing e.g. radio coverage over a geographical area, a service area 11 i.e. a first cell, of a radio access technology (RAT), such as NR, LTE, Wi-Fi®, WiMAX® or similar. The first radio network node 12 may be a transmission and reception point, a computational server, a base station e.g. a network node such as a satellite, a Wireless Local Area Network (WLAN) access point or an Access Point Station (AP STA), an access node, an access controller, a radio base station such as a NodeB, an evolved Node B (eNB, eNodeB), a gNodeB (gNB), a base transceiver station, a baseband unit, an Access Point Base Station, a base station router, a transmission arrangement of a radio base station, a stand-alone access point or any other network unit or node depending e.g. on the radio access technology and terminology used. The first radio network node 12 may be referred to as source access node or a serving network node wherein the first service area 11 may be referred to as a serving cell, source cell or primary cell, and the first radio network node communicates with the UE 10 in form of DL transmissions to the UE 10 and UL transmissions from the UE 10.

It should be noted that a service area may be denoted as cell, beam, beam group or similar to define an area of radio coverage.

Embodiments herein propose two main solutions to deliver a DCI scheduling subsequent packet transmissions without interfering with the legacy traffic in the existing CSSs: designing a new CSS or using a USS. In both cases, the UE 10 is configured to monitor the desired SS at the appropriate time, therefore the solution adopted should ensure that the configuration is available when needed or have a fallback mechanism if this does not happen.

In general, both solutions are meant to be used for PDCCH scrambled by a RNTI, e.g. a temporary C-RNTI or a new SDT-RNTI, which becomes normally valid after contention resolution and that will schedule the subsequent transmissions. This means that the "appropriate time" mentioned above should be after MsgB reception for 2-step RACH, and after the first PDSCH transmission after Msg3 (containing the Contention Resolution ID) for 4-step RACH. Nevertheless, in some cases it is possible to use the SS for other reasons (see below).

In one embodiment, C-RNTI, or a new RNTI, is considered valid after Msg3 or MsgA transmission event if contention has not been resolved yet and the SS is monitored consequently. In case a collision happened, the affected UEs will monitor the SS even if the radio network node 12 is not aware of their presence due to the collisions. The UEs that lost the contention will declare the procedure failed and stop monitor the SS by some other means.

New Common Search Space (CSS).

The baseline solution consists in the definition of a new CSS, for the sake of the discussion named "Type4-PDCCH CSS" in the remainder of the document. The Type4-PDCCH CSS carries messages scrambled by a RNTI, e.g., C-RNTI or a new SDT-RNTI, and it is mapped to CORESET0 although in resources orthogonal to, or minimizing the overlap with, the legacy CSSs mapped to the same CORESET, up to network implementation. As a consequence, all the RNTI address space can be used to scramble DCIs scheduling subsequent packet transmissions as required. The Type4-PDCCH CSS may be configured in System Information (SI), or via dedicated RRC as part of the UE-specific SDT configuration in, e.g., RRCRelease message since SDT is limited to RRC_INACTIVE state, and thus every UE is able to monitor the correct resources in time before the beginning of the SDT procedure.

In one embodiment, since Msg1 already indicates that the UE 10 started an SDT procedure, the Type4-PDCCH CSS can be used for scheduling all the transmissions relative to 4-step or 2-step RACH procedure instead of using the legacy Type1-PDCCH CSS. By doing this, the traffic is more distributed and RNTIs can even be reused. In particular the Type4-PDCCH CSS may carry DCI scrambled by RA-, MSGB-, TC-RNTI for Msg2, MsgB and Msg4 delivery.

In an alternative embodiment another RNTI is used instead of C-RNTI (generally named in the document SDT-RNTI) and the UE monitors this one in Type4-PDCCH CSS to receive DCIs scheduling subsequent packet transmissions.

In an alternative embodiment, the Type4-PDCCH CSS is used for RA-SDT UEs during the entire procedure, i.e., using a common RNTI, e.g. TC-RNTI, before contention resolution, and a UE-specific RNTI, e.g. SDT-RNTI, after contention has been resolved.

In another embodiment, Type4-PDCCH CSS is mapped to a CORESET different from CORESET0. In this way, the legacy CSSs do not have to share resources with Type4-PDCCH CSS and so the legacy PDCCH capacity is not limited in any way. The new CORESET may be defined in SI as well, and could be linked to the configuration of a separate bandwidth part (BWP) for RA-SDT, so that its configuration is available before the SDT procedure begins.

User-Specific Search Space (USS).

The baseline solution consists in an initial configuration phase where the UE 10 in RRC_CONNECTED receives a USS configuration, through legacy signalling e.g. as part of the UE-specific SDT configuration in RRCRelease message, that is meant to be used for subsequent packet transmission scheduling. When the UE 10 goes to RRC_INACTIVE the USS configuration is maintained, although suspended, and reactivated both in the UE and radio network node 12 once the SDT procedure has started and contention has been resolved). The USS configuration may be modified or removed through legacy signalling provided in RRC_CONNECTED, if the radio network node 12 wants to do that it will move the UE in RRC_CONNECTED instead of continuing the normal SDT procedure.

In one embodiment, the use of USS is limited to the cell in which the UE 10 was configured, and optionally only valid during the duration of a configured timer, to allow for garbage collection such that radio network node 12 need not store USS configurations for UEs that have left the cell. The timer would be restarted at any indication that the UE still remain in the cell and is still using SDT, e.g., restarted upon SDT transmission (e.g. in the RRCRelease finalizing the SDT procedure), any RRC signalling, RAN paging, etc.

In one embodiment, the USS configuration for the creation, modification or removal of the USS is provided at the end of the previous SDT procedure in RRCRelease without the need for the UE 10 to enter in RRC_CONNECTED.

In one embodiment, the USS configuration is given in Msg4 in the RA procedure. In one option, radio network node 12 determines if the UE 10 has been already configured with a USS in the release message. If the UE 10 was in the same cell when receiving the RRCRelease as it is when transmitting Msg3, then the radio network node 12 will be aware of this, since it is the same radio network node 12 sending the RRCRelease and receiving Msg3. In case radio network node 12 determines that the UE 10 has not been provided with a USS for the current cell, it sends the USS configuration in Msg4 together with the contention resolution MAC CE. In another example, the radio network node 12 can chose to reconfigure the USS received in the previous RRCRelease in Msg4.

In one further embodiment if a UE 10 does not have a valid USS configuration after the contention has been resolved, it will monitor one of the legacy CSSs instead (in particular Type1-PDCCH CSS). In this way the additional traffic will contend the resources together with the legacy non-SDT traffic, but this embodiment is meant to be a fallback mechanism to occur in anomalous situations. The network should provide a new USS configuration as soon as possible.

In case a cell reselection occurs while the UE 10 is in RRC_INACTIVE a few different behaviors can be defined. In one embodiment the UE releases the USS configuration and when it will perform SDT in the new cell the scenario described in the previous embodiment will occur, radio network node 12 does not have a valid USS configuration for the UE 10 and so it will use Type1-PDCCH CSS, monitored for the same reason by the UE 10. Once the new radio network node 12 configures a USS for the UE that has moved, it will inform the old radio network node so that it can release the previous USS configuration (i.e. via new signalling over Xn interface). Alternatively, the radio network node 12 releases the old USS configuration once a timer expires after the UE has not accessed the cell for a certain amount of time.

In another embodiment once a radio network node 12 assigns a USS configuration, it informs also the neighbor radio network nodes of such configuration although for those radio network nodes it will be inactive initially. In one example, the cells where the USS is valid is indicated in the RRCRelease message. When the UE 10 moves to a new cell and performs SDT, when Msg3/MsgA has been received, the new radio network node can recognize the UE 10 and thus retrieve and start using immediately the stored USS configuration. In this case, Msg4 can contain an indicator that indicates that the USS configured and received in a different cell, is valid also in the current cell. In case it cannot be use due to other existing colliding configurations, the radio network node 12 will use Type1-PDCCH CSS instead.

Figure 4:
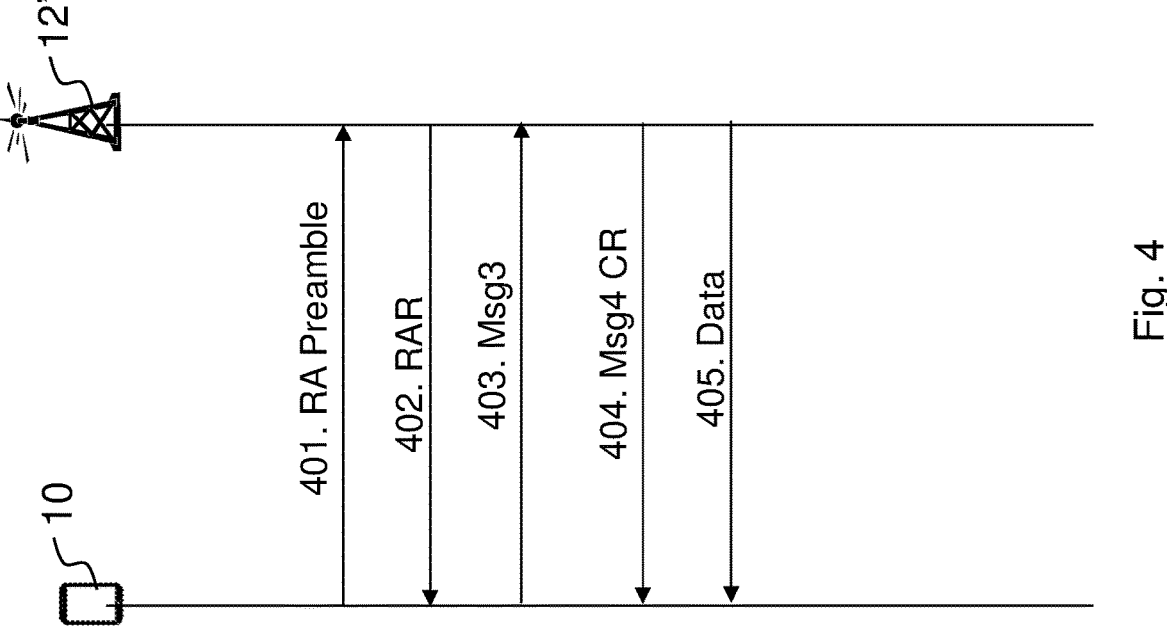
FIG. 4 is a schematic combined flowchart and signalling scheme according to some embodiments herein.

FIG. 4 is a signalling scheme depicting a 4-step RA procedure according to embodiments herein. The radio network node 12 may comprise a gNB 12'.

401. The UE 10 may randomly select a RA preamble (PREAMBLE_INDEX) corresponding to a selected SS/physical broadcast channel (PBCH) block, transmit the preamble on the PRACH occasion mapped by the selected SS/PBCH block. When the gNB 12' detects the preamble, it estimates the Timing advance (TA) the UE 10 should use in order to obtain UL synchronization at the gNB 12'.

402. The gNB 12' may send a RA response (RAR) including the TA, the temporary C-RNTI (temporary identifier) to be used by the UE 10, a Random Access Preamble identifier that matches the transmitted PRE-AMBLE_INDEX and a grant for Msg3. The UE 10 expects the RAR and thus, monitors PDCCH addressed to RA-RNTI to receive the RAR message from the gNB 12' until the configured RAR window (ra-Respon-seWindow) has expired or until the RAR has been successfully received. The gNB 12' may use the Type4-PDCCH CSS for scheduling the RAR. The UE 10 may use the Type4-PDCCH CSS for monitoring the RAR instead of using the legacy Type1-PDCCH CSS.

403. In Msg3 the UE 10 may transmit its identifier such as a UE ID, or more exactly the initial part of the 5G-Temporary Mobile Subscriber Identity (TMSI) for initial access or if it is already in RRC_CONNECTED or RRC_INACTIVE mode and needs to, e.g., re-synchronize, its UE-specific RNTI.

404. In Msg4 the gNB 12' responds by acknowledging the UE ID or C-RNTI. The Msg4 gives contention reso-lution (CR), i.e., only one UE ID or C-RNTI will be used even if several UEs have used the same preamble (and the same grant for Msg3 transmission) simulta-neously. For Msg4 reception, the UE 10 monitors temporary C-RNTI (if it transmitted its UE ID in Msg3) or C-RNTI (if it transmitted its C-RNTI in Msg3), or SDT-RNTI. The gNB 12' may use the Type4-PDCCH CSS for scheduling the Msg4. The UE 10 may use the Type4-PDCCH CSS for monitoring the Msg4 instead of using the legacy Type1-PDCCH CSS. In some embodiment the gNB 12' may provide the USS con-figuration in msg4 in the RA procedure.

405. The UE 10 may then monitor for PDDCH messages using the Type4-PDCCH CSS or the USS.

Figure 5:
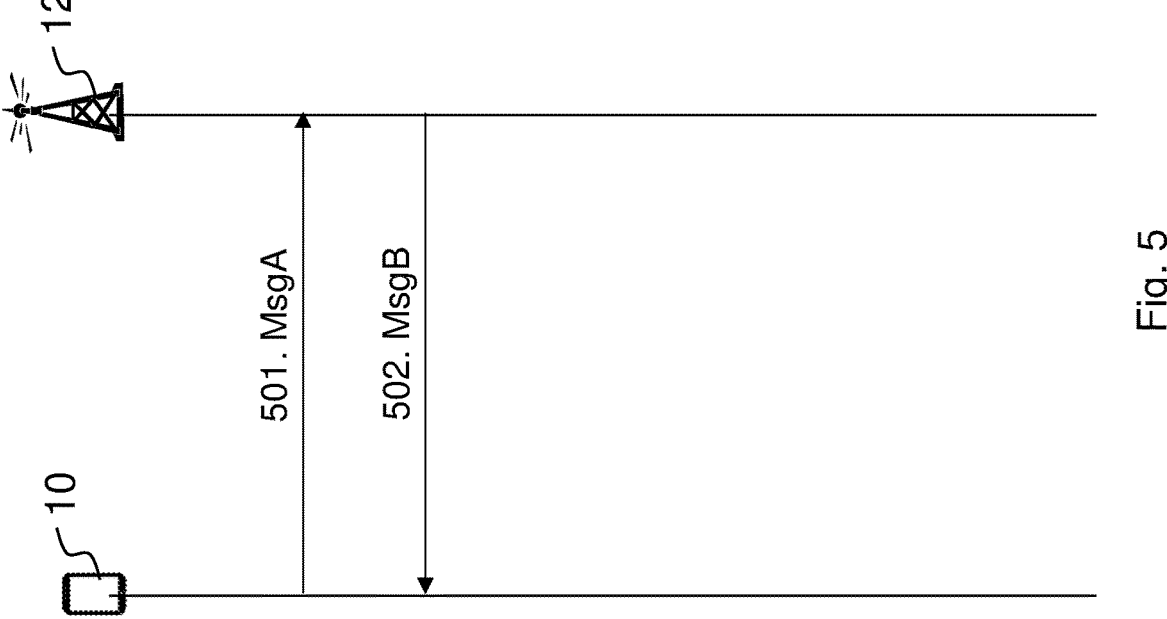
FIG. 5 is a schematic combined flowchart and signalling scheme according to some embodiments herein.

FIG. 5 is a signalling scheme depicting a 2-step RA procedure according to embodiments herein.

The UE 10 may have been configured with the Type4-PDCCH CSS or the USS.

The UE 10 may perform the new RA procedure for SDT in the following way:

501. UE 10 may transmit MsgA containing the "C-RNTI MAC CE" and multiplex user plane (UP) data as specified for SDT.

502. UE 10 monitors PDCCH for DCI scrambled by RNTI, e.g., SDT-RNTI, for new UL grants or DL assignments using the type4-PDCCH CSS or the USS.

The type4-PDCCH CSS is defined to schedule subse-quent packet transmissions.

Figure 6:
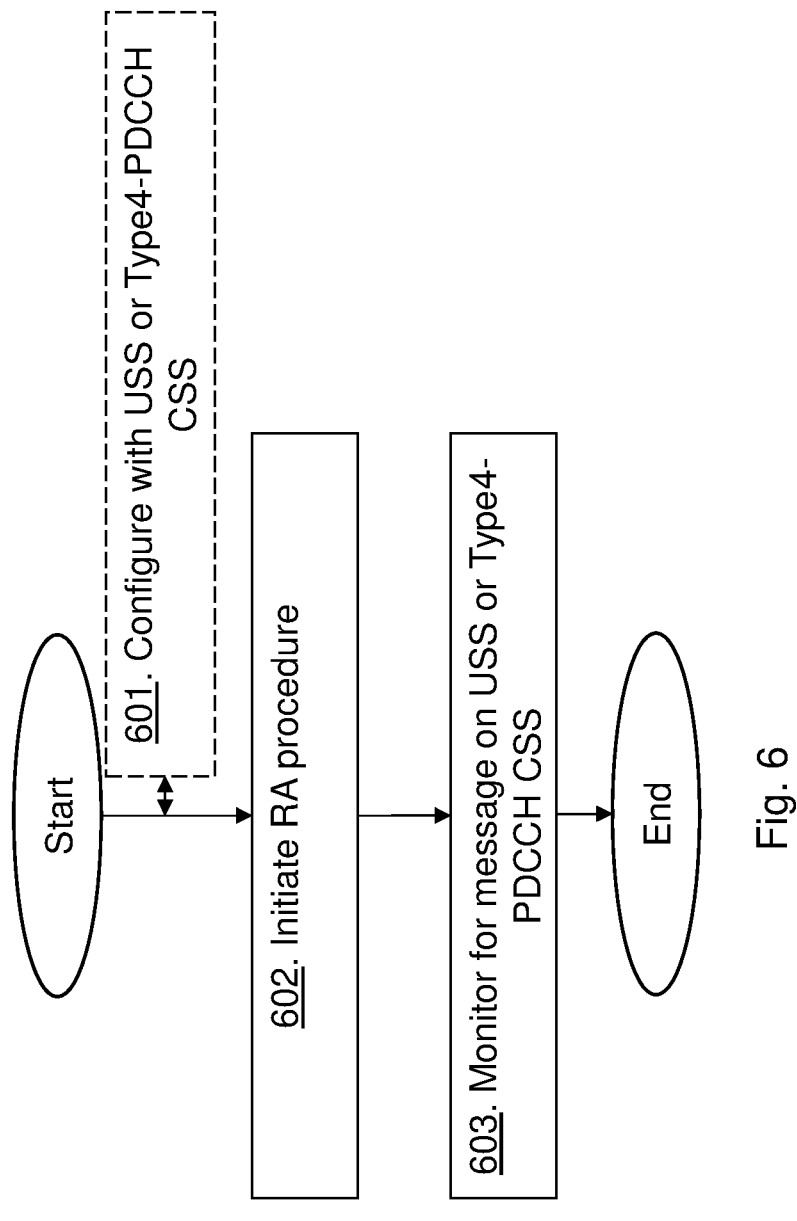
FIG. 6 is a schematic flowchart depicting a method performed by a user equipment according to some embodiments herein.

The method actions performed by the UE 10 for handling communication, e.g., gaining access, transitioning to active state, in the wireless communications network 1 according to embodiments herein will now be described with reference to a flowchart depicted in FIG. 6. The actions do not have to be taken in the order stated below, but may be taken in any suitable order. Dashed boxes indicate optional features.

Action 601. The UE 10 may be configured, or configure, with the Type4-PDDCH CSS or the USS, enabling the UE 10 to monitor for message in the Type4-PDDCH CSS or the USS.

Action 602. The UE 10 initiates a random access proce-dure for small data transmissions. For example, the UE 10 may transmit a message relating to a random access proce-dure for small data transmissions.

Action 603. The UE 10 monitors for a message using a Type4-PDCCH CSS or a USS, wherein the Type4-PDCCH CSS and/or the USS uses a radio resource set, such as CORESET0 or a CORESET different from CORESET0, separated or partly overlapping a legacy radio resource set for a legacy CSS. The legacy radio resource set may carry other messages scrambled by several different RNTIs. The radio resource set may be separated in that resources are orthogonal to resources of the legacy radio resource set. The message may comprise a RAR, an UL grant, or a DL assignment on the PDCCH with the DCI scrambled by a RNTI.

Figure 7:
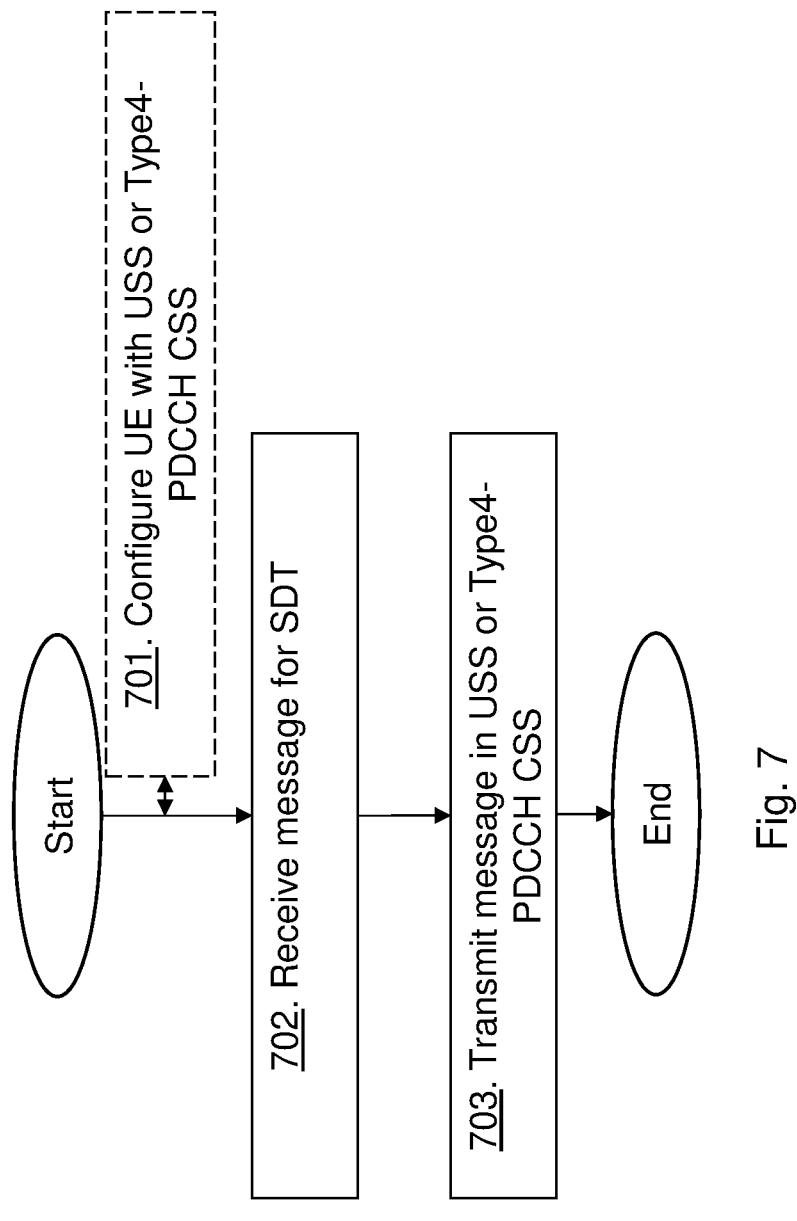
FIG. 7 is a schematic flowchart depicting a method performed by a radio network node according to some embodiments herein.

The method actions performed by the radio network node 12 for handling communication, e.g., controlling access to the wireless communications network 1 according to embodiments herein will now be described with reference to a flowchart depicted in FIG. 7. The actions do not have to be taken in the order stated below, but may be taken in any suitable order. Dashed boxes indicate optional features.

Action 701. The radio network node may configure the UE 10 with the Type4-PDCCH CSS or the USS.

Action 702. The radio network node 12 receives the message relating to the random access procedure for small data transmissions, from the UE 10.

Action 703. The radio network node 12 transmits the message on radio resources scheduled for the Type4-PDCCH CSS or the USS, wherein the Type4-PDCCH CSS and/or the USS uses the radio resource set, such as CORE-SET0 or a CORESET different from CORESET0, separated or partly overlapping the legacy radio resource for the legacy CSS. The legacy radio resource set may carry other messages scrambled by several different RNTIs. The radio resource set may be separated in that resources are orthogo-nal to resources of the legacy radio resource set. The scheduled message may comprise a RAR, an UL grant, or a DL assignment on the PDCCH with the DCI scrambled by a RNTI.

Figure 8:
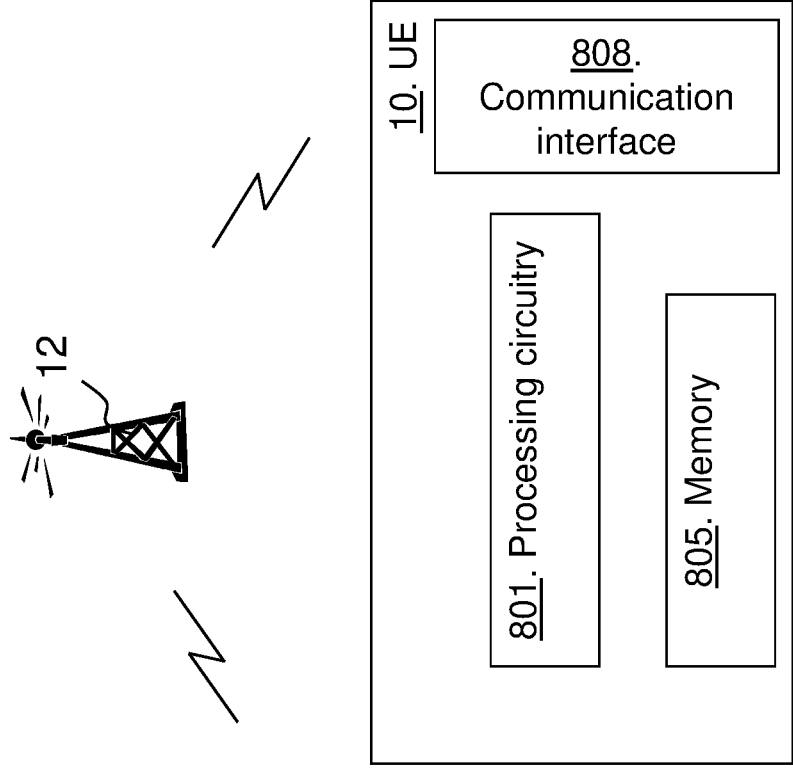
FIG. 8 is a block diagram depicting the UE according to some embodiments herein.
Figure 8:
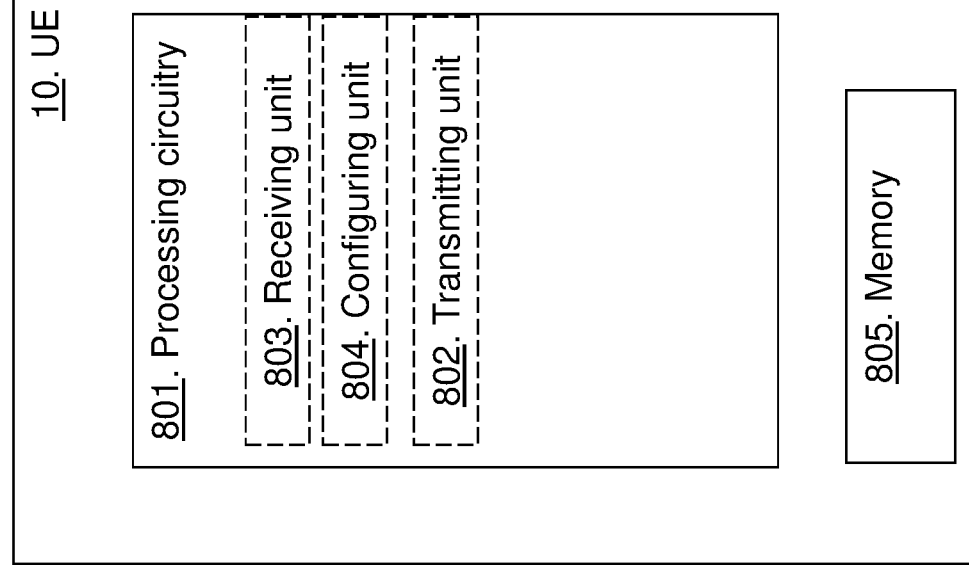

FIG. 8 is a block diagram depicting the UE 10, in two embodiments, for handling communication, e.g., handling access, in the wireless communication network 1 according to embodiments herein.

The UE 10 may comprise processing circuitry 801, e.g., one or more processors, configured to perform the methods herein.

The UE 10 may comprise a transmitting unit 802, e.g., a transmitter or transceiver. The UE 10, the processing cir-cuitry 801 and/or the transmitting unit 802 is configured to initiate the random access procedure for small data trans-missions.

The UE 10 may comprise a receiving unit 803, e.g., a receiver or transceiver. The UE 10, the processing circuitry 801 and/or the receiving unit 803 is configured to monitor for the message using the Type4-PDCCH CSS or the USS, wherein the type4-PDCCH CSS and/or the USS uses a radio resource set separated or partly overlapping a legacy radio resource set for the legacy CSS. The legacy radio resource set may carry other messages scrambled by several different RNTIs. The radio resource set may be separated in that resources are orthogonal to resources of the legacy radio resource set. The UE 10, the processing circuitry 801 and/or the receiving unit 803 may be configured to monitor for the message by monitoring the PDCCH for DCI scrambled by a RNTI for UL grants or DL assignments.

The UE 10 may comprise a configuring unit 804. The UE 10, the processing circuitry 801 and/or the configuring unit 804 may be configured to receive configuration from the radio network node 12, thus, to configure the UE with the Type4-PDDCH CSS or the USS.

The UE 10 further comprises a memory 805. The memory comprises one or more units to be used to store data on, such as indications, strengths or qualities, indications, Type4-PDCCH CSS, USS, grants, messages, execution conditions, user data, reconfiguration, configurations, scheduling information, timers, applications to perform the methods disclosed herein when being executed, and similar. The UE 10 comprises a communication interface 808 comprising transmitter, receiver, transceiver and/or one or more antennas. Thus, embodiments herein may disclose a UE 10 for handling communication in a wireless communications network, wherein the UE 10 comprises processing circuitry and a memory, said memory comprising instructions executable by said processing circuitry whereby said UE 10 is operative to perform any of the methods herein.

The methods according to the embodiments described herein for the UE 10 are respectively implemented by means of, e.g., a computer program product 806 or a computer program product, comprising instructions, i.e., software code portions, which, when executed on at least one processor, cause the at least one processor to carry out the actions described herein, as performed by the UE 10. The computer program product 806 may be stored on a computer-readable storage medium 807, e.g., a universal serial bus (USB) stick, a disc or similar. The computer-readable storage medium 807, having stored thereon the computer program product, may comprise the instructions which, when executed on at least one processor, cause the at least one processor to carry out the actions described herein, as performed by the UE 10. In some embodiments, the computer-readable storage medium may be a non-transitory or transitory computer-readable storage medium.

Figure 9:
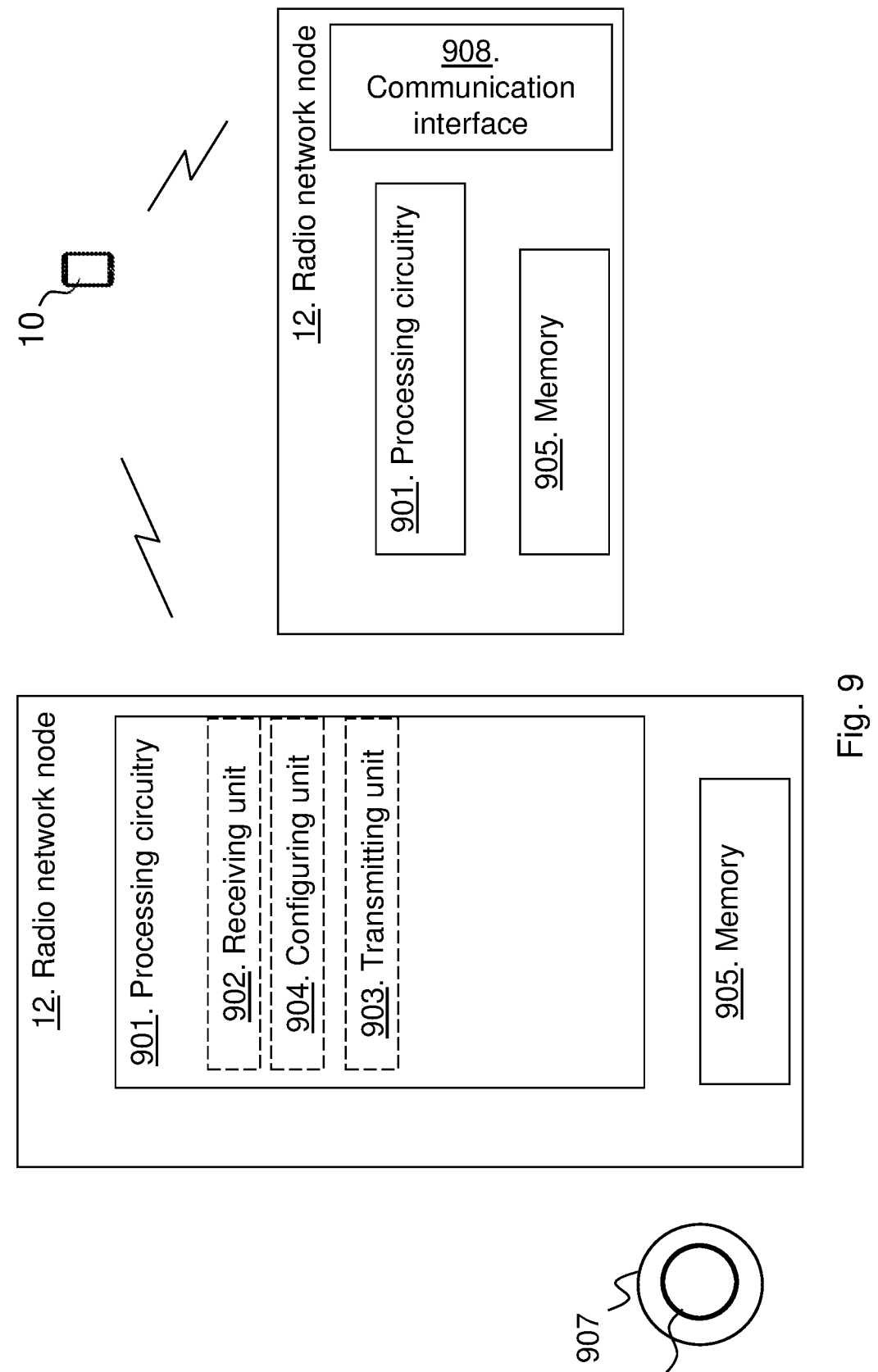
FIG. 9 is a block diagram depicting the radio network node according to some embodiments herein.

FIG. 9 is a block diagram depicting the radio network node 12, in two embodiments, for handling communication, e.g., handling, enabling UE access, in the wireless communication network 1 according to embodiments herein.

The radio network node 12 may comprise processing circuitry 901, e.g., one or more processors, configured to perform the methods herein.

The radio network node 12 may comprise a receiving unit 902, e.g., a receiver or transceiver. The radio network node 12, the processing circuitry 901 and/or the receiving unit 902 is configured to receive from the UE 10, the message relating to the random access procedure for small data transmissions.

The radio network node 12 may comprise a transmitting unit 903, e.g., a transmitter or transceiver. The radio network node 12, the processing circuitry 901 and/or the transmitting unit 903 is configured to transmit the message on radio resources scheduled for the Type4-PDCCH CSS or the USS, wherein the Type4-PDCCH CSS and/or the USS uses the radio resource set separated or partly overlapping the legacy radio resource set for the legacy CSS. The legacy radio resource set may carry other messages scrambled by several different RNTIs. The radio resource set may be separated in that resources are orthogonal to resources of the legacy radio resource set. The scheduled message may comprise a RAR, an UL grant, or a DL assignment on the PDCCH with the DCI scrambled by a RNTI.

The radio network node 12 may comprise a configuring unit 904. The radio network node 12, the processing circuitry 901 and/or the configuring unit 904 is configured to configure the UE 10 with the Type4-PDCCH CSS or the USS.

The radio network node 12 further comprises a memory 905. The memory comprises one or more units to be used to store data on, such as indications, strengths or qualities, indications, Type4-PDCCH CSS, USS, preambles, grants, messages, execution conditions, user data, reconfiguration, configurations, scheduling information, timers, applications to perform the methods disclosed herein when being executed, and similar. The radio network node 12 comprises a communication interface 908 comprising transmitter, receiver, transceiver and/or one or more antennas. Thus, embodiments herein may disclose a radio network node 12 for handling communication in a wireless communications network, wherein the radio network node 12 comprises processing circuitry and a memory, said memory comprising instructions executable by said processing circuitry whereby said radio network node 12 is operative to perform any of the methods herein.

The methods according to the embodiments described herein for the radio network node 12 are respectively implemented by means of, e.g., a computer program product 906 or a computer program product, comprising instructions, i.e., software code portions, which, when executed on at least one processor, cause the at least one processor to carry out the actions described herein, as performed by the radio network node 12. The computer program product 906 may be stored on a computer-readable storage medium 907, e.g., a universal serial bus (USB) stick, a disc or similar. The computer-readable storage medium 907, having stored thereon the computer program product, may comprise the instructions which, when executed on at least one processor, cause the at least one processor to carry out the actions described herein, as performed by the radio network node 12. In some embodiments, the computer-readable storage medium may be a non-transitory or transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices. Embodiments herein may configure the block error rate (BLER) target for a communication session between a network node and a UE.

Figure 10:
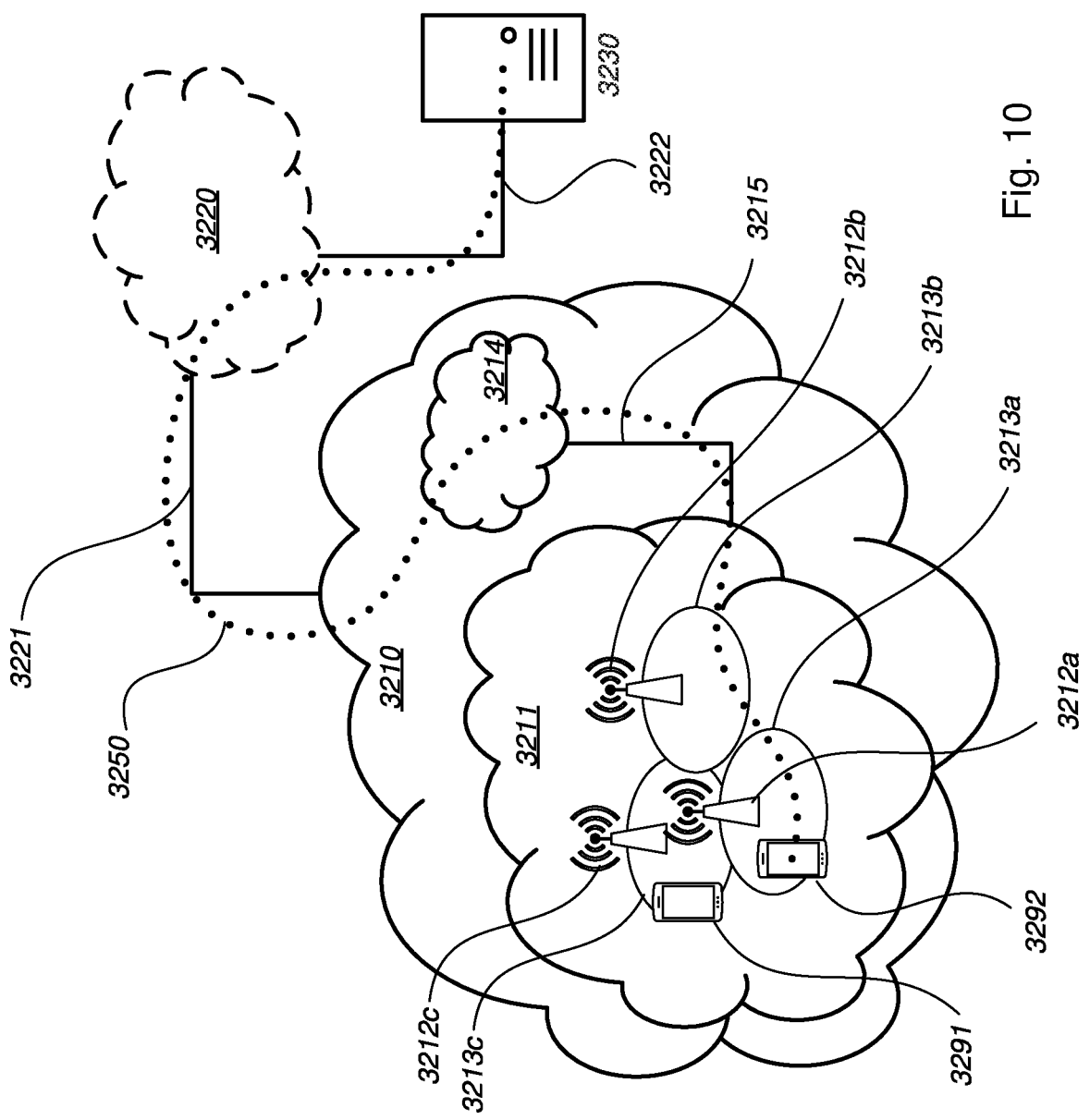
FIG. 10 schematically illustrates a telecommunication network connected via an intermediate network to a host computer.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
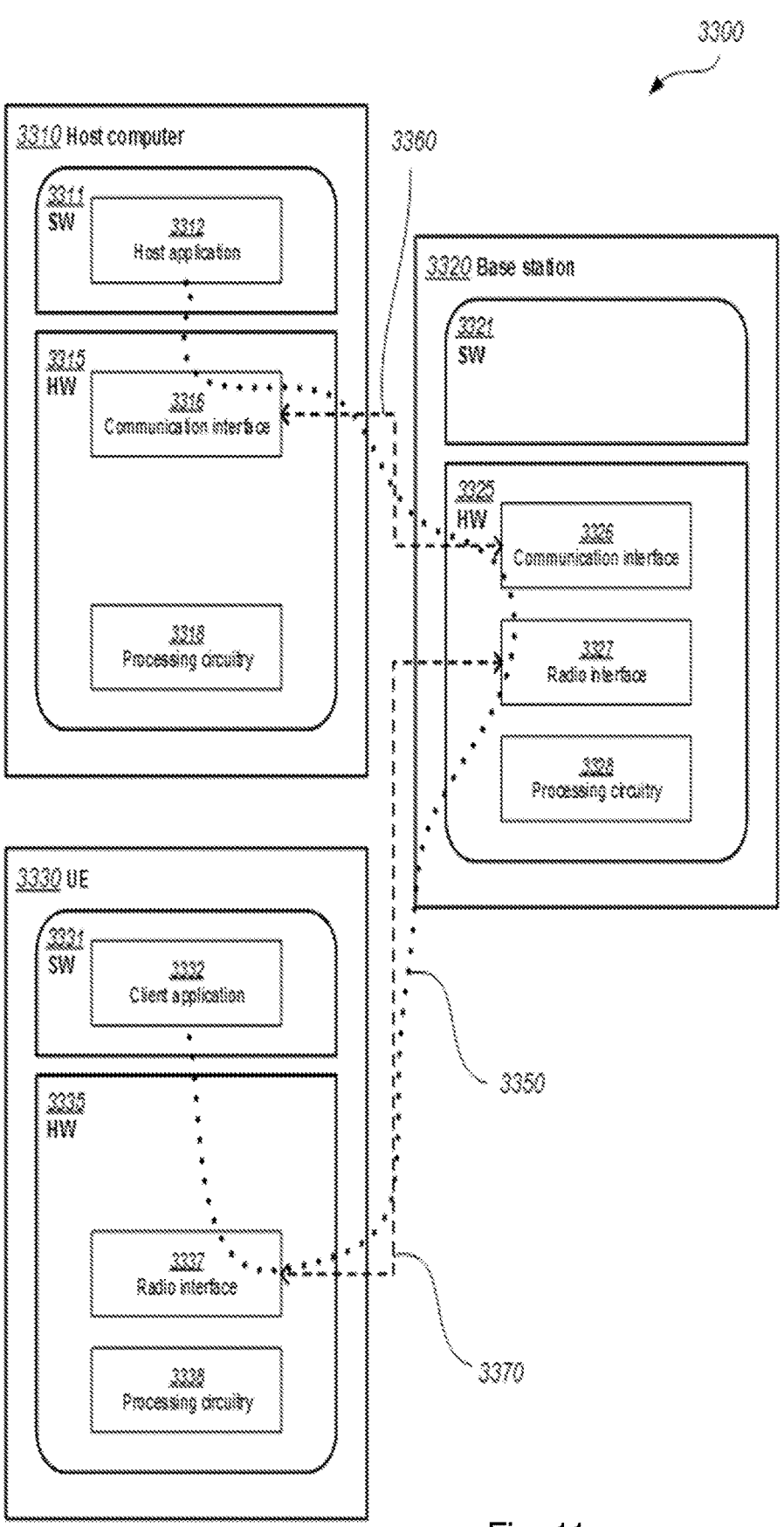
FIG. 11 is a generalized block diagram of a host computer communicating via a base station with a user equipment over a partially wireless connection.

It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

Figure 12:
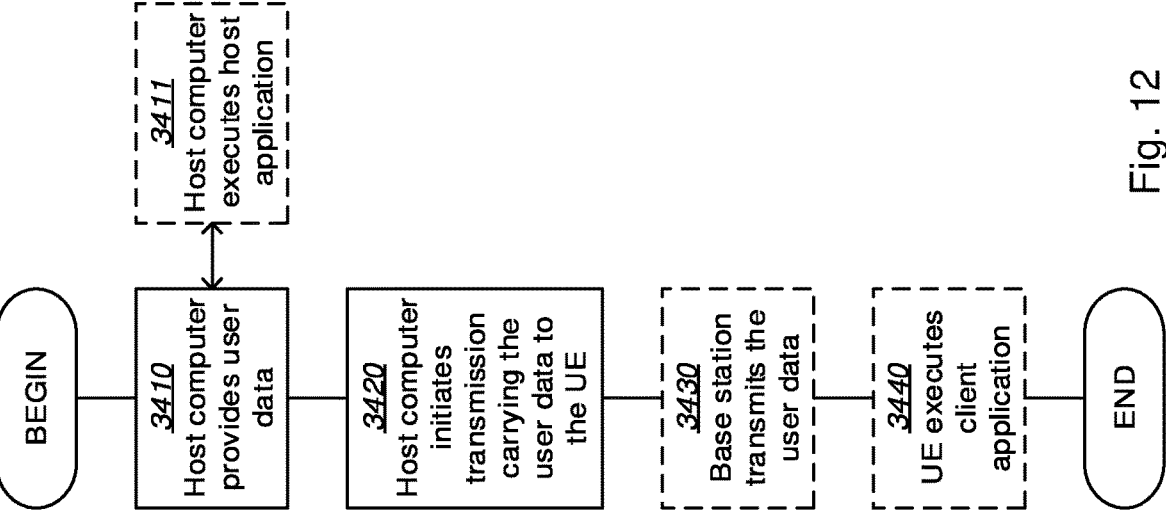

In FIG. 12, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may achieve an efficient search space and thereby provide benefits such as reduced waiting time, improved battery time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 13:
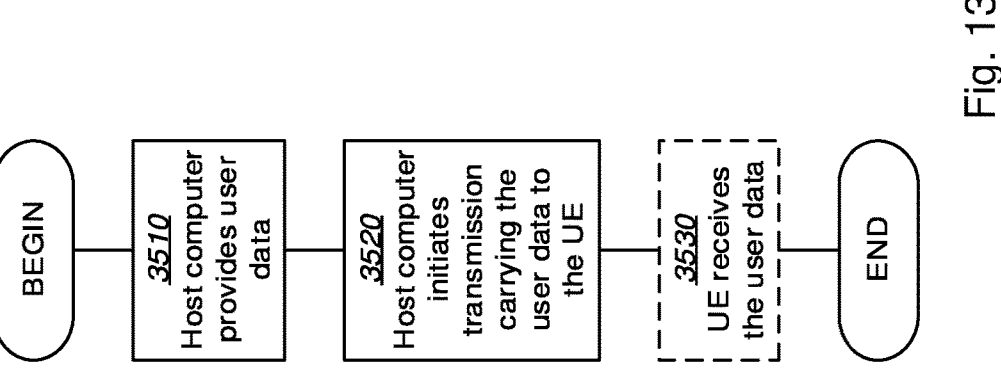
FIGS. 12-15 are flowcharts illustrating methods implemented in a communication system including a host computer, a base station and a user equipment.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 14:
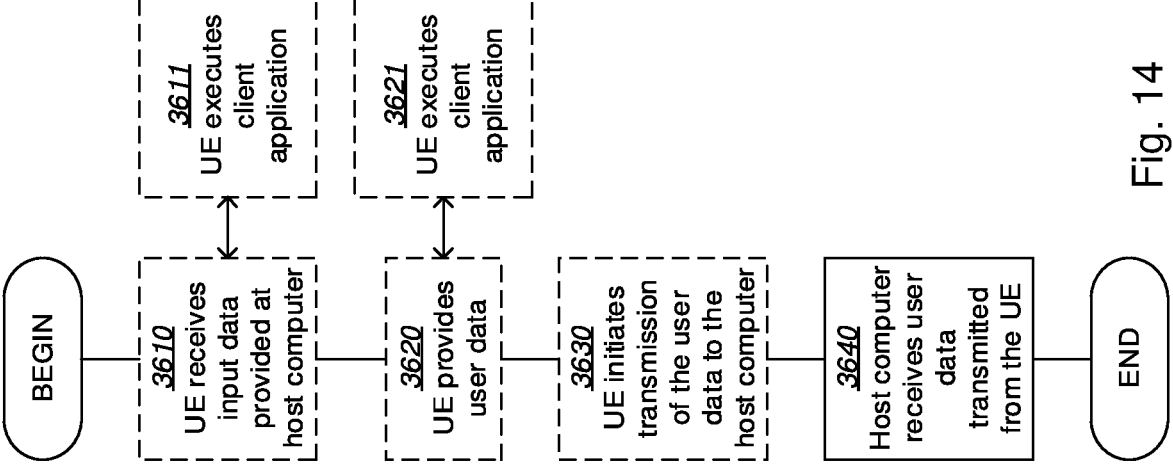

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 15:

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Abbreviations

CSS Common Search Space
SDT Small Data Transmission
SI System Information
SS Search Space
USS User-specific Search Space
The invention claimed is:

1. A method performed by a user equipment (UE) for handling communication in a wireless communications network, the method comprising:

initiating a random access procedure for small data transmissions; and using a Type4-physical downlink control channel (PDCCH) common search space (CSS) to monitor for downlink control information (DCI) that provides information identifying a resource used to deliver a msg2, msgB and/or msg4 message for the random access procedure, wherein the DCI is scrambled by a random access radio network temporary identifier (RA-RNTI), and the Type4-PDCCH CSS uses a radio resource set separated or partly overlapping a legacy radio resource set for a legacy CSS.

2. The method of claim 1, wherein the legacy radio resource set carries other messages scrambled by several different random network temporary identifiers (RNTI).

3. The method of claim 1, wherein the radio resource set is separated in that resources are orthogonal to resources of the legacy radio resource set.

4. The method of claim 1, wherein the DCI is scrambled by an RA-RNTI for uplink (UL) grants or downlink (DL) assignments.

5. The method of claim 1, further comprising
configuring the UE with the Type4-PDDCH CSS.

6. A non-transitory computer readable storage medium storing a computer program comprising instructions, which, when executed by processing circuitry of a UE configures the UE to perform the method of claim 1.

7. A method performed by a radio network node for handling communication, in a wireless communications network, the method comprising:

receiving from a user equipment (UE) a message relating to a random access procedure for small data transmissions; and transmitting downlink control information (DCI) for the random access procedure on radio resources scheduled for a Type4-physical downlink control channel (PDCCH) common search space (CSS), wherein the DCI comprises information identifying a resource used to deliver a msg2, msgB and/or msg4 message for the random access procedure, and the Type4-PDCCH CSS uses a radio resource set separated or partly overlapping a legacy radio resource set for a legacy CSS.

8. The method of claim 7, wherein the legacy radio resource set carries other messages scrambled by several different random network temporary identifiers (RNTI).

9. The method of claim 7, wherein the radio resource set is separated in that resources are orthogonal to resources of the legacy radio resource set.

10. The method of claim 7, wherein the scheduled message comprises a random access response, an uplink (UL) grant, or a downlink (DL) assignment on a PDCCH with a downlink control information (DCI) scrambled by a random network temporary identifier (RNTI).

11. The method of claim 7, further comprising
configuring the UE with the Type4-PDDCH CSS.

12. A non-transitory computer readable storage medium storing a computer program comprising instructions, which, when executed by processing circuitry of a network node configures the network node to perform the method of claim 7.

13. A user equipment (UE) for handling communication in a wireless communications network, the UE comprising:

memory; and processing circuitry, wherein the UE is configured to
initiate a random access procedure for small data transmissions; and use a Type4-physical downlink control channel (PDCCH) common search space (CSS) to monitor for downlink control information (DCI) that provides information identifying a resource used to deliver a msg2, msgB and/or msg4 message for the random access procedure, wherein the DCI is scrambled by a random access radio network temporary identifier (RA-RNTI), and the Type4-PDCCH CSS uses a radio resource set separated or partly overlapping a legacy radio resource set for a legacy CSS.

14. The UE of claim 13, wherein the legacy radio resource set carries other messages scrambled by several different random network temporary identifiers, RNTI.

15. The UE of claim 13, wherein the radio resource set is separated in that resources are orthogonal to resources of the legacy radio resource set.

16. The UE of claim 13, wherein the UE is configured to monitor for the message by monitoring a PDCCH for downlink control information scrambled by a random network temporary identifier for uplink (UL) grants or downlink (DL) assignments.

17. The UE of claim 13, wherein the UE is further configured to configure the UE with the Type4-PDDCH CSS.

18. A radio network node for handling communication, in a wireless communications network, the radio network node comprising:

memory;

processing circuitry;

a transmitter; and a receiver operable to receive from a user equipment (UE) a message relating to a random access procedure for small data transmissions, wherein the radio network node is configured to:

after receiving the message from the UE relating to the random access procedure, transmit downlink control information (DCI) for the random access procedure on radio resources scheduled for a Type4-physical downlink control channel (PDCCH) common search space (CSS), wherein the DCI comprises information identifying a resource used to deliver a msg2, msgB and/or msg4 message for the random access procedure, and the Type4-PDCCH CSS uses a radio resource set separated or partly overlapping a legacy radio resource set for a legacy CSS.

19. The radio network node of claim 18, wherein the legacy radio resource set carries other messages scrambled by several different random network temporary identifiers.

20. The radio network node of claim 18, wherein the radio resource set is separated in that resources are orthogonal to resources of the legacy radio resource set.

21. The radio network node of claim 18, wherein the scheduled message comprises a random access response, an uplink (UL) grant, or a downlink (DL) assignment on a PDCCH with a downlink control information (DCI) scrambled by a random network temporary identifier (RNTI).

22. The radio network node of claim 18, wherein the radio network node is further configured to configure the UE with the Type4-PDDCH CSS.

* * * * *